(12) United States Patent
Saito et al.

(10) Patent No.: US 6,572,479 B1
(45) Date of Patent: Jun. 3, 2003

(54) SHOCK ABSORBER

(75) Inventors: Mikio Saito, Motosu-gun (JP); Masahiro Katoh, Chiryu (JP); Yasuyuki Wakahara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/654,546

(22) Filed: Sep. 1, 2000

(30) Foreign Application Priority Data

| Oct. 22, 1999 | (JP) | 11-300442 |
| Oct. 22, 1999 | (JP) | 11-300480 |
| Oct. 22, 1999 | (JP) | 11-300492 |
| Feb. 23, 2000 | (JP) | 2000-045589 |

(51) Int. Cl.[7] .................. F02N 11/02
(52) U.S. Cl. ........... 464/46; 74/7 A; 29/DIG. 32
(58) Field of Search ............. 464/42, 43, 45, 464/46, 47, 48; 74/7 A, 7 E; 192/56.6, 113.34, 113.36; 29/DIG. 32, DIG. 37

(56) References Cited

U.S. PATENT DOCUMENTS

| 4,516,443 A | * | 5/1985 | Hamano et al. | 464/47 X |
| 4,635,489 A | | 1/1987 | Imamura et al. | |
| 4,667,534 A | * | 5/1987 | Kataoka | 192/113.36 X |
| 5,101,953 A | * | 4/1992 | Payvar | 192/113.36 X |
| 5,905,309 A | | 5/1999 | Ohmi et al. | |
| 5,905,310 A | * | 5/1999 | Nagao | 74/7 E X |

FOREIGN PATENT DOCUMENTS

| DE | 238 425 A | 8/1986 |
| JP | 60 220232 | 11/1985 |
| JP | 62 242134 | 10/1987 |
| JP | 63-277859 | 11/1988 |
| JP | 9-042318 | 2/1997 |

\* cited by examiner

Primary Examiner—Greg Binda
(74) Attorney, Agent, or Firm—Oliff & Berridge, PLC

(57) ABSTRACT

A shock absorber for a starter is presented. The shock absorber includes a rotary disk, a stationary disk and a disk spring. The rotary disk is pressed by the disk spring against a stationary disk to generate frictional force when the rotary disk is rotated by an excessive shock thereby absorbing the shock. The rotary disk has a plurality of press-formed rectangular dimples at a surface opposite the stationary disk, and each side of each the rectangular dimple inclines to a direction of rolling of the raw material of the rotary disk.

14 Claims, 6 Drawing Sheets

FIG. 3A
FIG. 3B
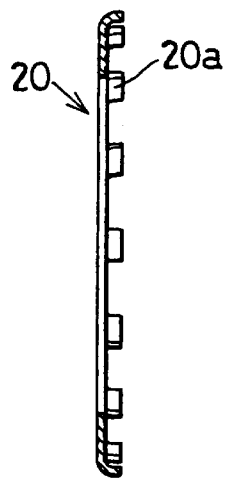
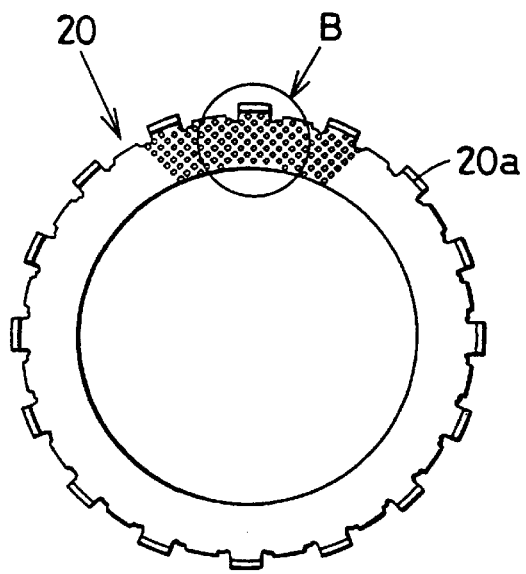
FIG. 4A
FIG. 4B
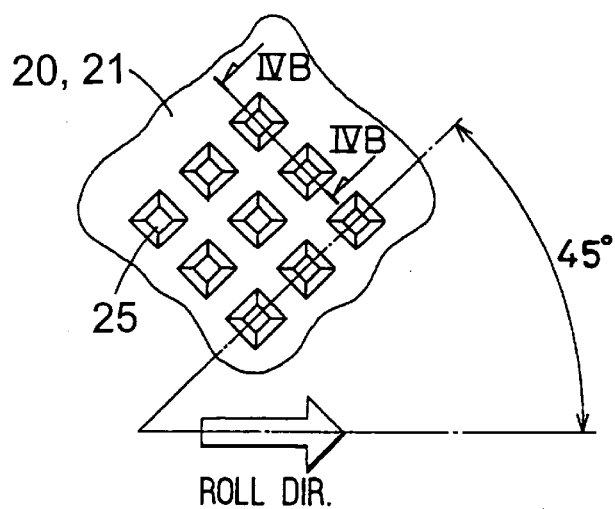
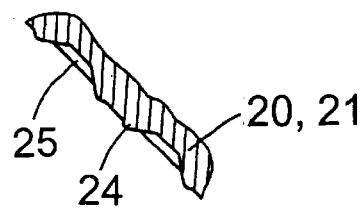

FIG. 8A
FIG. 8B
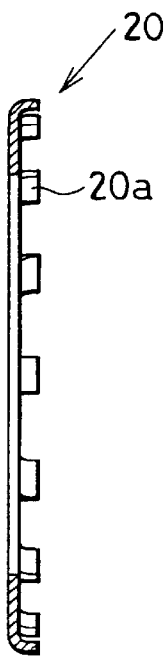
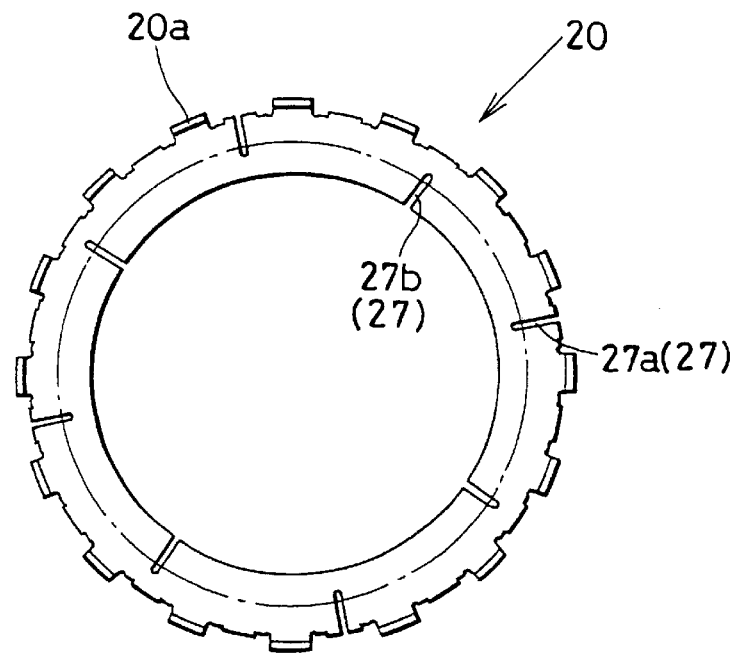
FIG. 9A
FIG. 9B
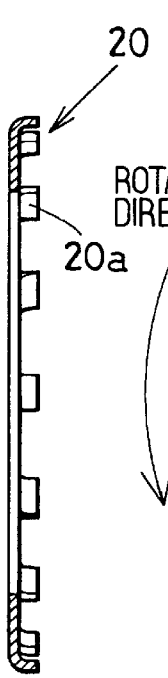
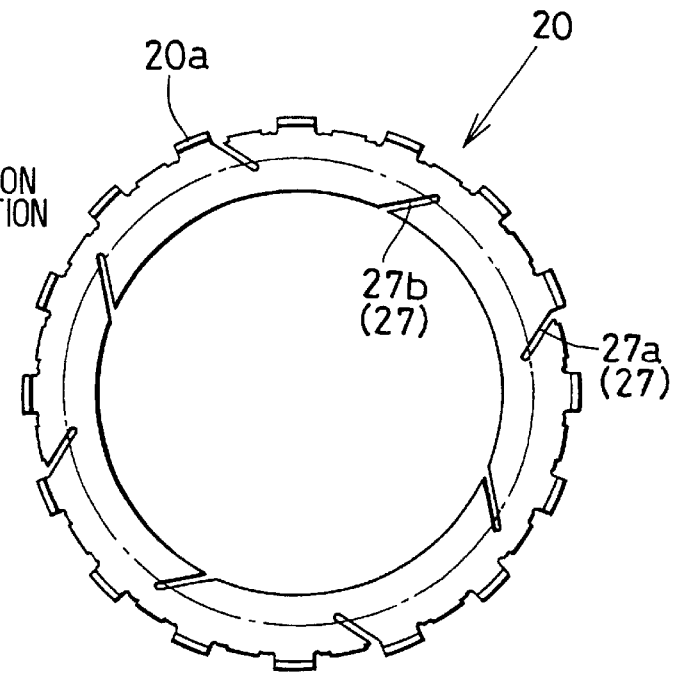

SHOCK ABSORBER

CROSS REFERENCE TO RELATED APPLICATION

The present application is based on and claims priority from Japanese Patent Applications: Hei 11-300442, filed Oct. 22, 1999, Hei 11-300480, filed Oct. 22, 1999, Hei 11-300492, filed Oct. 22, 1999, and 2000-45589, filed Feb. 23, 2000, the contents of which are incorporated herein by reference.

BACKGROUND OF THE INVENTION

1. Field of the Invention

The present invention relates to a shock absorber for absorbing a shock.

2. Description of the Related Art

JP-A-63-277859 discloses a starter equipped with a shock absorber for interrupting transmission of an excessive torque. In such a shock absorber for a starter, a rotary disk is pressed against a stationary disk to generate a frictional force so that rotation of the rotary disk can be controlled. Accordingly, when a shock that is more than a certain normal torque is applied to the rotary disk, the rotary disk slips or rotates, thereby absorbing the shock.

Such a rotary disk has a plurality of dimples and small banks formed around the dimples at a height of about tens of microns, providing a press-formed frictional surface. An amount of grease is filled in the spaces (dimples) between the stationary disk and the rotary disk with the banks being in contact with the surface of the stationary disk to prevent seizing.

Because an array direction of the dimples is the same as the direction of the rolling of the raw material of the rotary disk, the height of the banks are not formed even. That is, the bank of the sides in parallel with the direction of rolling is lower than the bank of the sides that is perpendicular to the direction of rolling. Only two sides of the rectangular dimples can touch the stationary disk. Therefore, the two side-banks may be worn away more easily than the four side-banks. This lowers the lifetime of the shock absorber.

If another two-side banks start touching the stationary disk after the first two side-banks initially touched the stationary disk have worn away, the friction factor changes too abruptly to control the transmission torque.

As the rotary disk has rotated for a long time, the spaces for the grease between the head of the dimple and the bottom thereof become narrower. Accordingly, a sufficient amount of grease can not be supplied to the sliding surfaces of the disks. This causes the seizing and shortens the lifetime.

SUMMARY OF THE INVENTION

The invention has been made in view of the above problem and has an object of providing a shock absorber that can make the height of the banks (or raised portions) of the rectangular dimples even.

According to a main feature of the invention, rotary disk of a shock absorber has a plurality of press-formed rectangular dimples at a surface opposite the stationary disk. The rectangular dimples have four sides that incline to a direction of rolling of the raw material of the rotary disk. In such a case, the difference in height between the four side banks can be effectively reduced so that four banks can touch the stationary disk evenly.

Preferably, each the rectangular dimples may be square dimples. In such a case, each side of the square shape inclines to the direction of rolling at 45 degree in angle.

The plurality of rectangular dimples can be formed on the surface of the stationary disk instead of the rotary disk.

According to another feature of the invention, a rotary disk of the shock absorber has an oil hole or an oil groove as an oil reservoir. The oil hole or oil groove penetrates the rotary disk in the thickness direction.

Even if the surface of the rotary disk wears away to some extent, the oil hole or oil groove does not disappear, so that grease can be prevented from reducing. The grease filled in the oil hole or oil groove is supplied to the sliding surfaces as long as the rotary disk rotates, so that the seizing can be prevented.

Preferably, the rotary disk has a plurality of oil holes at circumferentially and radially different positions, and the plurality of oil holes are disposed so that the radial positions thereof partially overlap each other on a circumference of the rotary disk. When the rotary disk rotates, a plurality of rotation loci of the oil holes is formed to partly overlap each other.

Accordingly, the supply of the grease is not stopped in the radial direction of the rotary disk where the plurality of the oil holes are formed, so that the grease can be continuously and uniformly supplied to the friction surface of the rotary disk.

The plurality of oil holes is preferably disposed spiral about the center of the rotary disk over the circumference of the rotary disk. The plurality of oil holes is dispersed evenly in the circumferential and radial directions so that the flatness of the rotary disk's surface opposite the stationary disk can be secured. This prevents uneven contacts with the stationary disk.

The rotary disk can have a first one of the oil holes that opens radially outward and a second one of the oil holes that opens radially inward, and the first one and the second one of the oil holes extend to partially overlap each other in the radial direction. Accordingly, the first one and the second one of the oil holes partially overlap each other when the rotary disk rotates. Therefore, the grease can be supplied evenly to the friction surface of the rotary disk.

In addition, the rigidity of the rotary disk becomes smaller than the oil holes not open to either outward or inward, so that the rotary disk can deform along the stationary disk. This equalizes the pressure on the surface of the rotary disk to result in even frictional wear, so that the lifetime of the rotary disk can be increased.

The first one and second one of the oil holes preferably incline to the rotational direction from radial directions, so that the grease can enter the first and the second ones of the oil holes while the rotary disk rotates. In other words, the grease can be continuously supplied to the friction surface of the rotary disk.

The stationary disk of the shock absorber can have oil reservoirs instead of the rotary disk.

In this case, the same effect as the rotary disk having the oil reservoir can be obtained. Therefore, reduction in strength of the rotary disk can be avoided.

According to another feature of the invention, a rotary disk of a shock absorber is comprised of a plurality of circumferentially divided pieces.

Because the surface area of each the divided piece is small relative to the entire surface area of the rotary disk, each divided piece can have a high flatness. As a result, pressure can be applied to each divided piece evenly, so that the surface pressure of the rotary disk can be made even.

A stationary disk can have a plurality of circumferentially divided pieces, instead of the rotary disk.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 3A is a cross-sectional side view of a rotary disk of the shock absorber according to the first embodiment, and FIG. 3B is a plan view of the same;

FIG. 4A is a plan view illustrating an array of dimples and projections formed on the rotary disk or stationary disk and FIG. 4B is a cross-sectional view of the same cut along line IVB—IVB;

FIG. 8A is a cross-sectional side view of a rotary disk of a shock absorber according to a fifth embodiment of the invention, and FIG. 8B is a plan view of the same;

FIG. 9A is a cross-sectional side view of a rotary disk of a shock absorber according to a sixth embodiment of the invention, and FIG. 9B is a plan view of the same;

DETAILED DESCRIPTION OF THE PREFERRED EMBODIMENTS

First Embodiment

Shock absorber according to a first embodiment of the invention that is mounted into a starter is described with reference to FIGS. 1–4.

Figure 1:
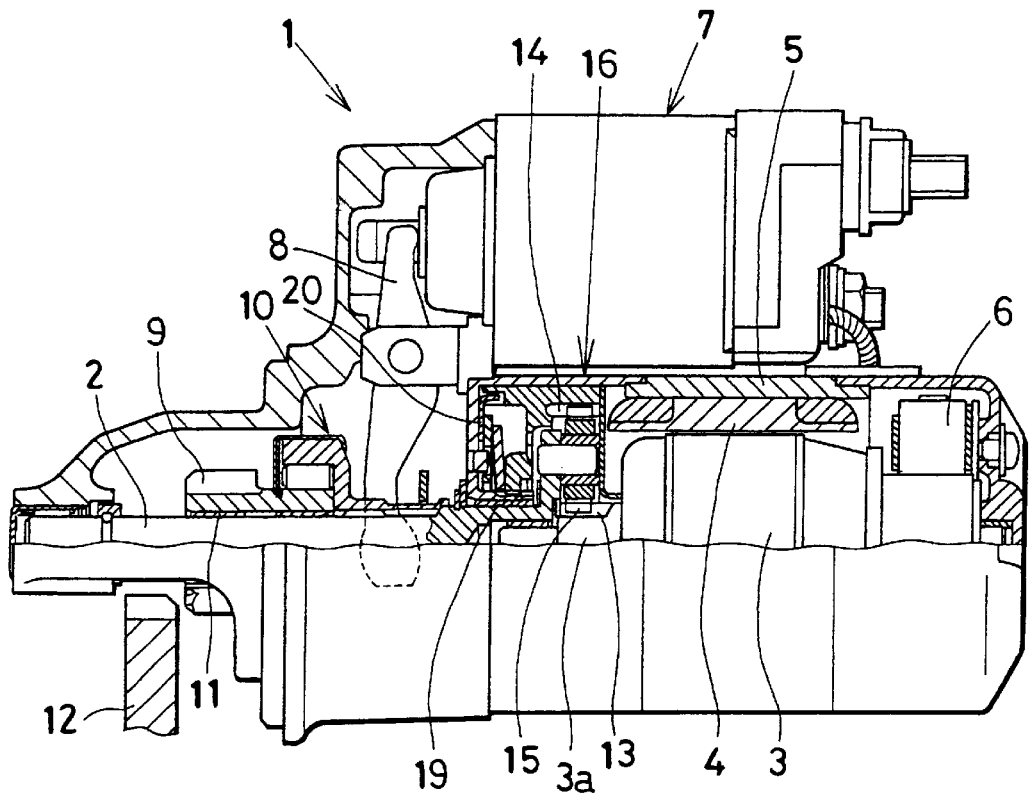
FIG. 1 is a half cross-sectional longitudinal view of a starter.
Figure 2:
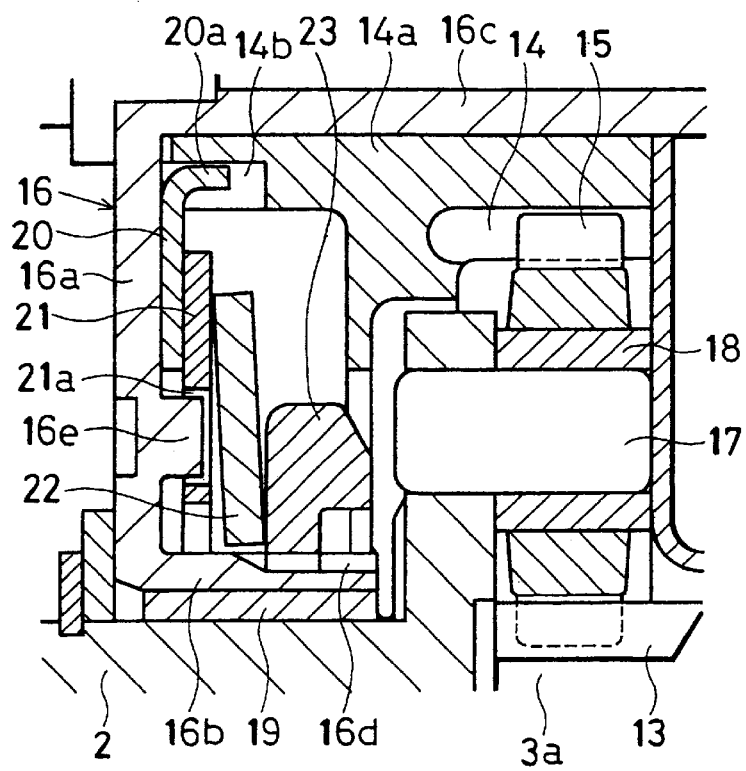
FIG. 2 is an enlarged fragmentary cross-sectional view illustrating a main portion of a speed reduction unit and a shock absorber according to a first embodiment of the invention.

As shown in FIG. 1, starter 1 includes a speed reduction unit, output shaft 2 and a shock absorber according to a first embodiment of the invention. The speed reduction unit reduces the rotation speed of later described starter motor and transmits it to output shaft 2. The shock absorber absorbs an excessive torque or a shock applied to the speed reduction unit.

The starter motor is a well-known DC motor that is comprised of armature 3, stator poles 4, yoke 5 and brushes 6. When a key switch is turned on and a pair of internal contacts of magnet switch 7 is closed, armature 3 is energized through brushes 6 to rotate.

Magnet switch 7 opens or closes the internal contacts as a plunger (not shown) moves to drive pinion gear 9, together with one-way clutch 10, back and forth.

Pinion gear 9 is slidably fitted to the outer periphery of output shaft 2 via bearing 11. Pinion gear 9 is driven forward (to the left in FIG. 1) together with one-way clutch 10 by lever 8 to engage engine ring gear 12 to transmit the torque to ring gear 12.

One way clutch 10 is fitted to the outer periphery of output shaft 2 via a helical spline to transmit the rotation of output shaft 2 to pinion gear 9 and to interrupt transmission of torque between output shaft 2 and pinion gear 9.

The speed reduction unit is comprised of sun gear 13, ring-shaped internal gear 14 having internal teeth at portions around sun gear 13, and planetary gears 14 disposed between sun gear 13 and internal gear 14 to mesh the same. Sun gear 13 has external teeth formed around the outer periphery of armature shaft 3a. The speed reduction unit and the shock absorber are covered by center case 16, which is described below.

Internal gear 14 is provided with cylindrical outer wall 14a, which is rotatably fitted into the inner periphery of outer cylindrical portion 16c of center case 16. Internal gear 14 is connected with rotary disk 20 at an axial end of outer wall 14a and is restricted to rotate as rotary disk 20 is at a standstill. A plurality of recesses 14b is formed at the inner periphery of the axial end of outer wall 14a at equal intervals.

Planetary gear 15 meshes sun gear 13 and internal gear 14, and is rotatably supported by pin 17 force-fitted to a rear portion of output shaft 2 via bearing 18.

When sun gear 13 is rotated by armature 3, planetary gear 15 rotates on its axis and revolves around sun gear 13. Thus, revolution of planetary gear 15 is transmitted through pin 17 to output shaft 2 to rotate output shaft 2.

Center piece 16 has annular front wall 16a disposed perpendicularly to output shaft 2, inner cylindrical portion 16b extending axially rearward from the inner peripheral edge of front wall 16a, and outer cylindrical portion 16c extending from the outer peripheral edge of front wall 16a. The rear edge of outer cylindrical portion 16c is connected with the front edge of yoke 5, and the inner periphery of inner cylindrical portion 16b rotatably supports output shaft 2 via bearing 19. Male screw 16d is formed on the outer periphery of inner cylindrical portion 16b.

Shock absorber is comprised of rotary disk 20, stationary disk 21, disc spring 22, and adjust screw 23.

As shown in FIGS. 3A and 3B, rotary disk 20 is a press-formed metal ring. Rotary disk 20 is disposed in contact with front wall 16a and is detained in internal gear 14 by a plurality of claws 20a, which are formed at the circumference of outer wall 14a, respectively inserted into the plurality of recesses 14b.

As shown in FIG. 4B, a plurality of projections or banks 24 is formed at opposite surface of rotary disk 20. Banks 24 are formed when a plurality of dimples 25 (depressions) are press-formed at the surfaces of rotary disk 20. The projections or banks are arranged in a rectangular configuration.

Square dimples 25 are formed by square-pole punches (not shown), and four sides of the square dimples respectively incline 45 degree in angle to a direction of rolling of the raw material of rotary disk 20.

Stationary disk 21 is also a press-formed metal ring similar to rotary disk 20, and is disposed in contact with the frictional surface of rotary disk 20. Stationary disk 21 has a plurality of circumferentially disposed openings 21a. A plurality of projections 16e is formed at front wall 16a and respectively. inserted into openings 21a so that the rotation of stationary disk 21 can be stopped by center case 16.

Disc spring 22 is a common spring for pushing stationary disk 21 toward rotary disk 20.

Adjust screw 23 engages male screw 16d of inner cylindrical portion 16b of center case 16 to adjust an initial load of disc spring 22 according to the screw-in distance thereof.

Operation of starter 1 will be described hereafter.

When a coil (not shown) of magnet switch 7 is energized by turning on a key switch, plunger is pulled right in FIG. 1 to move pinion gear 9 forward, together with one-way clutch 10, along output shaft 2.

When the plunger moves and the internal switch of magnet switch 7 closes, armature 3 is energized to rotate. The rotation speed of armature 3 is reduced by the speed reduction unit and transmitted to output shaft 2.

The rotation of output shaft 2 is transmitted to pinion gear 9 through one-way clutch 10. When pinion gear moves to a position to engage ring gear 12, the rotation of pinion gear is transmitted to ring gear 12, which starts the engine.

After engine starts, the key switch is turned off to deenergize the coil, the plunger returns to the initial position, so that pinion gear 9 separates from ring gear 12 and goes back along output shaft 2. Then, the internal switch of magnet switch 7 opens to cut electric supply to armature 3 to stop the same.

Operation of the shock absorber is described next.

If a shock that is larger than a certain torque is applied to rotary disk 20 of the shock absorber, rotational disk 20, which has been at a stand still, rotates to absorb the shock. In other words, if the shock is caused when pinion gear 9 engages ring gear 12, the shock is transmitted through output shaft 2 and internal gear 14 to rotary disk 20. Then, rotary disk 20 slides in the rotational direction relative to front wall 16a of center case 16 and stationary disk so that internal gear 14, which is restricted by rotary disk 20, can rotate. Accordingly, a shock larger than a certain torque is prevented from being applied to the torque transmission system between armature 3 and pinion gear 9.

None of the four sides of square dimples is parallel with the direction of roll, and each side equally inclines to the direction. Accordingly, all banks 24 formed along the sides of the square shapes can be made even in height.

As a result, banks 24 of each dimple 25 engage stationary disk 21. Therefore, the wear rate of banks 24 can be made smaller than the prior art case in which only two banks 24 engage stationary disk 21. This increases the lifetime of the shock absorber. Because four banks 24 evenly engage stationary disk 21 from the beginning, the frictional factor may not change abruptly during the operation. This makes torque control easy.

Variation of the First Embodiment

Dimples 25 can be formed on stationary disk 21 such as shown in FIGS. 4A and 4B.

Corners of each dimple may be either sharp or round.

The shock absorber according to the invention can be applied to a drive unit other than the starter, such as a brake or a clutch.

Second Embodiment

Figure 5A:
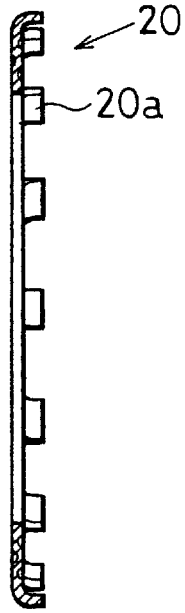
FIG. 5A is a cross-sectional side view of a rotary disk of the shock absorber according to a second embodiment of the invention.

A shock absorber according to a second embodiment of the invention will be described with reference to FIGS. 5A and 5B.

Rotary disk 20 is a press-formed metal ring. Rotary disk 20 is disposed in contact with front wall 16a and is detained in internal gear 14 by a plurality of claws 20a, which are formed at the circumference of outer wall 14a, respectively inserted into the plurality of recesses 14b.

A plurality of projections or banks (not shown) is formed at opposite surfaces of rotary disk 20 in the same manner as described with reference to FIGS. 3A and 3B. Banks 24 are formed when a plurality of dimples 25 (depressions/not shown) is press-formed at the surfaces of rotary disk 20.

In addition, rotary disk 20 has a plurality of oil holes 24 penetrating the same in the thickness direction. The plurality of oil holes 24 is disposed almost evenly in the circumferential direction. Each group of four circumferentially lined oil holes 24 forms a spiral line about the center O of rotary disk 20 thereof so that the radial position thereof overlaps one another.

Figure 5B:
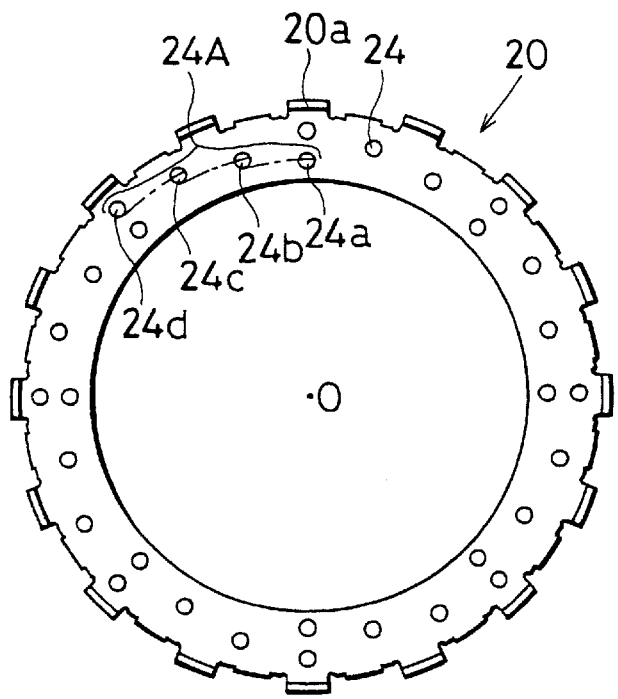
FIG. 5B is a plan view of the same.

More in detail, in FIG. 5B, four spirally lined oil holes 24 are respectively named, from inside to the outside, first oil hole 24a, second oil hole 24b, third oil hole 24c and fourth oil hole 24d. If rotary disk 20 rotates, first oil hole 24a and second oil hole 24b partially overlap each other on a circumference of rotary disk 20. Second oil hole 24b and third oil hole 24c also partially overlap each other, and third oil hole 24c and fourth oil hole 24d partially overlap each other, on circumferences of rotary disk 20.

Four spirally lined oil holes 24 form oil hole group 24A. A plurality of oil hole groups 24A is disposed in succession all around rotary disk 20. That is, first oil hole 24a of one group 24A overlaps in the radial direction with (or can be located with the same circumferential position as) fourth oil hole 24d of another group 24 adjacent thereto. However, first oil hole 24a of one group 24A and fourth oil hole 24d of another group 24A, as shown in FIG. 5B, are preferably located at the same circumferential position of rotary disk 20 as one of the plurality of claws 20a.

When rotary disk 20 is assembled, grease is applied to the friction surface and to the plurality of oil holes 24.

Stationary disk 21 is also a press-formed metal ring similar to rotary disk 20, and is disposed in contact with the frictional surface of rotary disk 20. As described in the first embodiment with reference to FIG. 2, stationary disk 21 also has a plurality of circumferentially disposed openings 21a. A plurality of projections 16e is formed at front wall 16a and is respectively inserted into openings 21a so that the rotation of stationary disk 21 can be stopped by center case 16.

Disc spring 22 is a common spring for pushing stationary disk 21 toward rotary disk 20. Adjust screw 23 engages male screw 16d of inner cylindrical portion 16b of center case 16 to adjust an initial load of disc spring 22 according to a screw-in distance thereof.

Even if the friction surface (projections) of rotary disk 20 so wears away that the grease on the surface decreases, the plurality of oil holes would not disappear. Accordingly, the grease filled in the plurality of oil holes 24 is supplied to the friction surface as long as rotary disk 20 rotates. This prevents seizing of rotary disk 20.

When rotary disk 20 slides to rotate, a plurality of loci of oil holes 24 is formed in the radial direction of rotary disk 20 (four in this embodiment). Because the plurality of loci partly overlaps one another, the supply of the grease from the range between first oil hole 24a and fourth oil hole 24d may not be intermitted in the radial direction of rotary disk 20. As a result, the grease can be supplied to the friction surface of rotary disk 20 evenly, so that an excellent slip torque can be obtained. In particular, a plurality of oil hole group 24A is formed spiral about the center O of rotary disk 20. This can supply the grease all around the friction surface of rotary disk 20 with a minimum number of oil holes.

Flatness of rotary disk 20 can be also assured so that incomplete contact of rotary disk 20 with front wall 16a of center case 16 and stationary disk 21 can be prevented.

Moreover, first oil hole 24a of one group and fourth oil hole 24d of another group can be located where claws 20a are located. This prevents the rigidity of rotary disk 20 from lowering.

Third Embodiment

Figure 6:
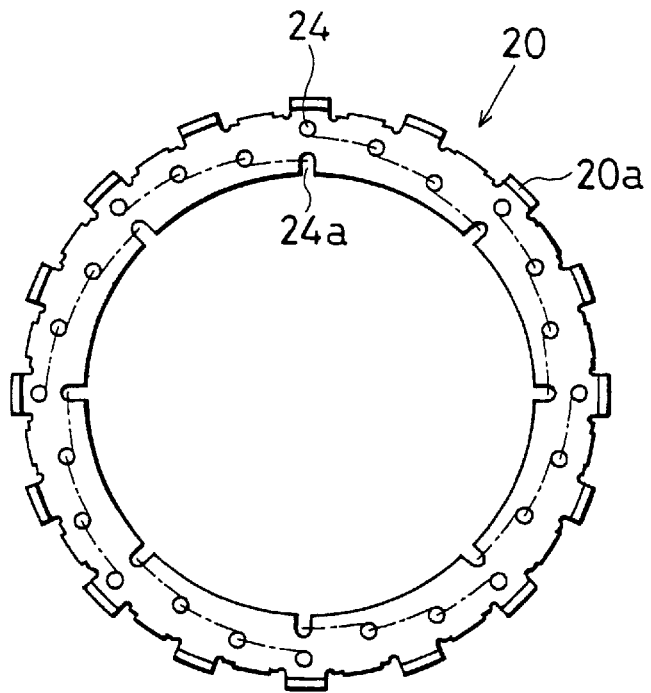
FIG. 6 is a plan view of a rotary disk of a shock absorber according to a third embodiment of the invention.

Rotary disk 20 of a shock absorber according to a third embodiment of the invention is described with reference to FIG. 6.

Oil holes at the inner peripheral edge (or the outer peripheral edge) of rotary disk 20 can open inward. In this case, the same effect as the second embodiment can be obtained.

Fourth Embodiment

Figure 7:
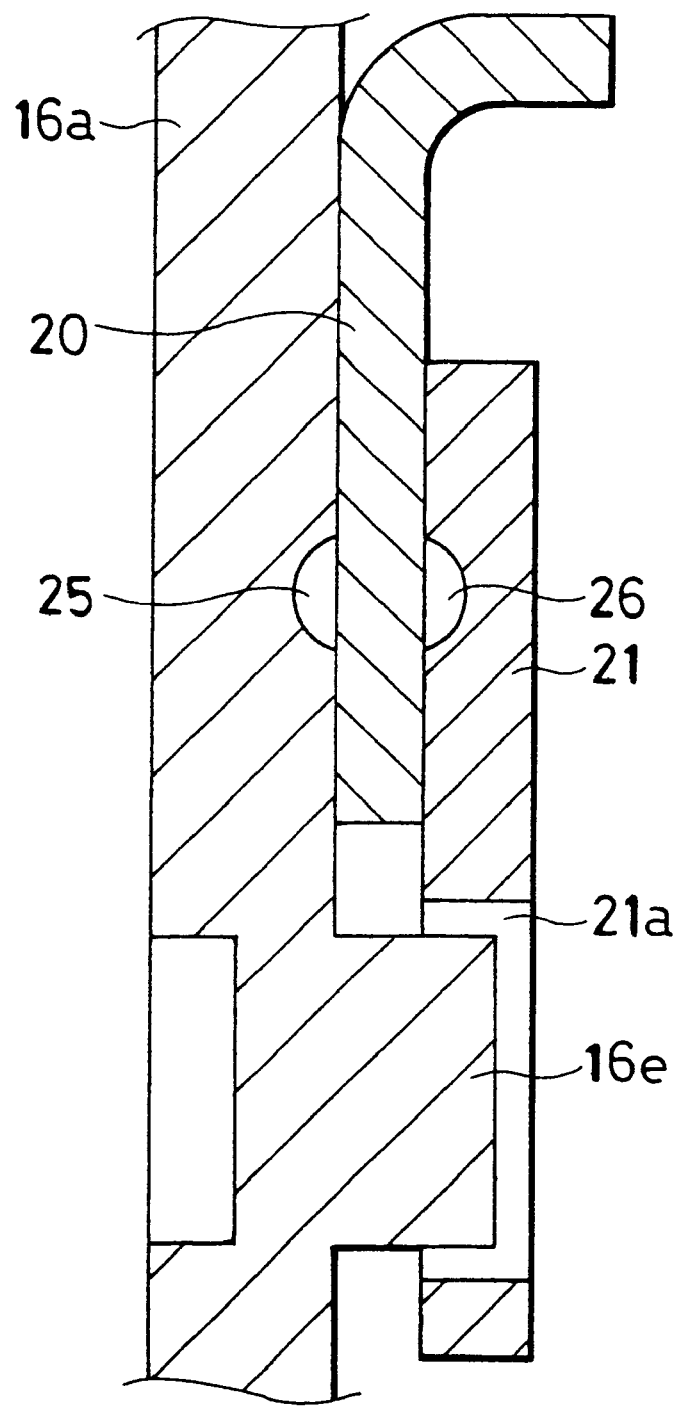
FIG. 7 is a fragmentary enlarged cross-sectional view of a main portion of a shock absorber according to a fourth embodiment of the invention.

Shock absorber according to a fourth embodiment of the invention is described with reference to FIG. 7.

Oil recesses or reservoirs 25 and 26 are formed on the surface of center case 16 and on the surface of stationary disk 21 opposite the friction surfaces of rotary disk 20. If a through hole for oil recess 25 is formed at wall 16a to penetrate the same in the thickness direction, grease may leak out of center case. A recess is also formed for oil reservoir 26 at stationary disk 21. Oil recesses 25 and 26 are preferably formed at the same positions as oil holes 24, which are radially and circumferentially different from each other but overlap each other.

Accordingly, the same effect as oil hole 24 formed at rotary disk 20 can be obtained. If oil recesses 25, 26 are formed at front wall 16a and stationary disk 21, the number of oil holes 24 of rotary disk 20 can be reduced or eliminated.

As a result, oil holes 24 prevent rotary disk 20 from reducing the strength thereof.

Fifth Embodiment

A rotary disk of a shock absorber according to a fifth embodiment is described with reference to FIGS. 8A and 8B.

Rotary disk 20 is provided with oil grooves 27. Each oil groove 27 is formed to penetrate rotary disk 20 in the thickness direction and to extend long and narrowly in the radial direction to hold grease as oil hole 24.

Oil grooves 27 are formed of a plurality of first oil grooves 27a which opens radially outward and a plurality of second oil grooves 27b which opens radially inward. Oil grooves 27a and 27b are alternately disposed in the circumferential direction. Each first oil groove 27a and each second oil groove 27b overlap each other at the bottom portion thereof in the radial direction if they are put side by side in the circumferential direction. In other words, the radially inner head portion of first oil grooves 27a is formed to extend beyond the centerline of the width of rotary disk 20 (one-dot chain line in FIG. 8B). On the other hand, the radially outer bottom portion of second oil grooves 27b is formed to extend beyond the centerline.

When rotary disk 20 rotates, the rotating locus of first oil groove 27a and the rotating locus of second oil groove 27b overlap each other. Therefore, the grease can be continuously supplied to the friction surface in the width direction of rotary disk 20. First oil groove 27a opens outward at the outer periphery of rotary disk 20, and second oil groove 27b opens inward at the inner periphery of rotary disk. Therefore, rotary disk 20 becomes flexible so that rotary disk 20 can easily deform along stationary disk. As a result, the surface pressure of rotary disk 20 becomes more uniform, and the friction surface can wear away uniformly. This increases the lifetime of rotary disk.

Sixth Embodiment

A shock absorber according to a sixth embodiment of the invention is described with reference to FIGS. 9A and 9B.

Oil grooves 27 (first oil grooves 27a and second oil grooves 27b) are formed at rotary disk 20. First oil grooves 27a and second oil grooves 27b incline to the rotation direction of rotary disk 20.

When rotary disk 20 rotates, the grease filled at the outer periphery of rotary disk 20 enters the inside of first oil grooves 27a from the opening of first oil grooves 27a. In the same manner, the grease filled at the inner periphery of rotary disk 20 enters the inside of second oil grooves 27b from the opening of second oil grooves 27b. In other words, it is possible to intentionally take the outside grease into first and second oil grooves 27a and 27b. Therefore, grease is always filled in first and second oil grooves 27a and 27b to be continuously supplied to the friction surface of rotary disk 20, so that a reliable shock absorber can be provided.

Seventh Embodiment

A shock absorber according to a seventh embodiment is described with reference to FIGS. 10 and 11.

A plurality of projections or banks (not shown) is formed at opposite surfaces of rotary disk 20. The plurality of banks is formed when a plurality of dimples is press-formed at the surfaces of rotary disk 20.

Figure 10:
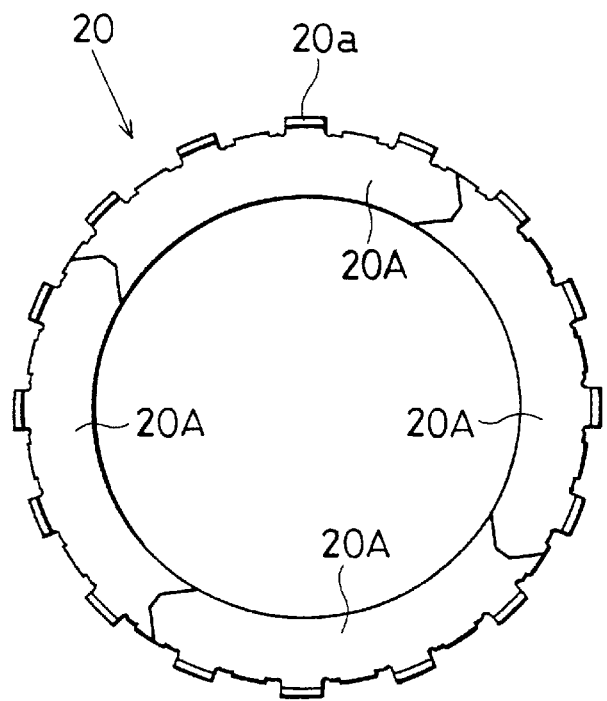
FIG. 10 is a plan view of a rotary disk of a shock absorber according to a seventh embodiment of the invention.
Figure 11:
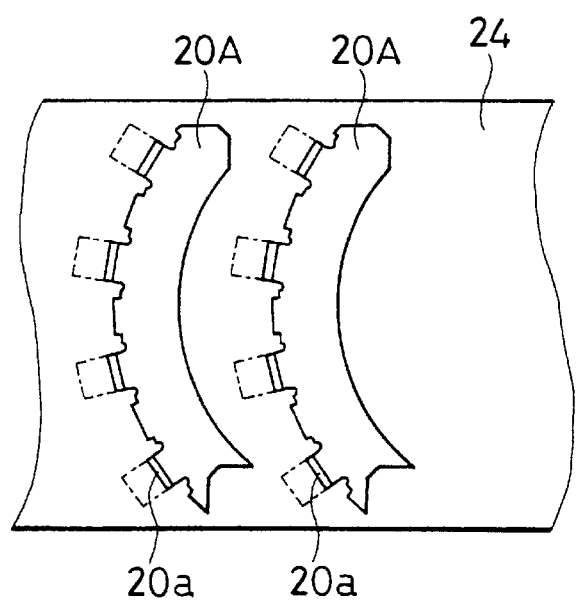
FIG. 11 is a plan view illustrating a method of manufacturing divided pieces that form the rotary disk of the shock absorber according to the seventh embodiment.

Rotary disk 20 is formed of a plurality of divided pieces 20A, as shown in FIG. 10. Because the plurality of divided pieces 20A is stamped out from portions of metal plate 24 close to each other, as shown in FIG. 11, each divided piece 20A can have a high flatness, so that the yield rate of the raw material is high. In addition, because each divided piece 20A is disposed in a circle at small intervals, it is possible to fill grease in gaps between divided pieces 20A. In order to prevent each divided piece 20A from moving to the inner periphery thereby to remove the gaps, center case 16 is provided with a circular support for supporting the inner periphery of rotary disk 20.

Moreover, the spring force of disk spring 22 can be evenly applied to each divided piece 20A, so that the surface pressure of rotary disk 20 can be made even. In other words, partial contact of rotary disk with front wall 16a and stationary disk 21 can be prevented. This reduces wear of the friction surface and increases the lifetime of the shock absorber.

Variations

Instead of rotary disk 20, stationary disk 21 can also divided in the circumferential direction. Each of the shock absorbers according to the above embodiments can be applied to any driving device other than a starter, such as a brake or a clutch.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than restrictive, sense.

What is claimed is:

1. A shock absorber comprising a rotary disk, a stationary disk and a disk spring, said rotary disk being pressed by said disk spring against said stationary disk to generate frictional force when said rotary disk is rotated relative to said stationary disk by an excessive shock thereby absorbing the shock, said rotary disk being formed from a rolled material that is rolled in a direction of rolling;

said rotary disk having a plurality of rectangular dimples and projections on an axially outwardly facing surface of said rotary disk to confront said stationary disk, each of said projections extending outwardly from all sides of one of said rectangular dimples to form a rectangular configuration, wherein each side of each of said projections is equally angled relative to said direction of rolling.

2. The shock absorber as claimed in claim 1, wherein each of said projections is arranged in a square configuration and each side of each of said square projections is angled relative to the direction of rolling at 45 degrees.

3. A shock absorber comprising a rotary disk, a stationary disk and a disk spring, said rotary disk being pressed by said disk spring against said stationary disk to generate frictional force when said rotary disk is rotated relative to said stationary disk by an excessive shock thereby absorbing the shock, said stationary disk being formed from a rolled material being rolled in a direction of rolling;

said stationary disk having a plurality of rectangular dimples and projections, each of said projections extending outwardly from an axially outwardly facing surface of said stationary disk around each of said rectangular dimples and confronting said rotary disk, each of said projections having sides being equally inclined relative to said direction of rolling.

4. The shock absorber as claimed in claim 3, wherein each of said projections is arranged in a square configuration and each side of each of said square projections is angled relative to the direction of rolling at 45 degrees.

5. An engine starter including a pinion gear, a speed reduction unit and a shock absorber disposed between said pinion gear and said speed reduction unit, said shock absorber comprising a stationary disk, a spring, and a rotary disk pressed against said stationary disk to generate frictional force when said rotary disk is rotated by an excessive shock thereby absorbing the shock, said rotary disk being formed from a rolled material that is rolled in a direction of rolling, said rotary disk having a plurality of rectangular dimples and projections, each of said projections extending outwardly from an axially outwardly facing surface of said rotary disk around each of said dimples and confronting said stationary disk, each of said projections being equally inclined relative to the direction of rolling of the rolled material.

6. An engine starter including a pinion gear, a speed reduction unit and a shock absorber disposed between said pinion gear and said speed reduction unit, said shock absorber comprising a stationary disk, a spring, and a rotary disk pressed against said stationary disk to generate frictional force when said rotary disk is rotated relative to said stationary disk by an excessive shock thereby absorbing the shock, at least one of said stationary and rotary disks being formed from a rolled material being rolled in a direction of rolling and having a plurality of press-formed rectangular dimples and projections formed within an axially outwardly facing surface of said at least one of said stationary and rotary disks and confronting another of the at least one stationary and rotary disks, wherein each side of each of said rectangular dimples is equally angled relative to said direction of rolling.

7. A method of forming a friction disk for a shock absorber of a starter motor, the method comprising:

rolling a raw material into a plate, thereby aligning an internal structure of the raw material in a direction of the rolling;

stamping a substantially circular body from the plate; and pressing a plurality of rectangular dimples into an axially outwardly facing surface of the circular body, thereby causing a plurality of projections to rise from the surface of the substantially circular body adjacent edges of the dimples, wherein each side of the rectangular dimples and the projections is equally aligned at an angle relative to the rolling direction of the raw material.

8. The method according to claim 7, wherein each of the rectangular dimples and projections are aligned at about 45 degrees relative to the rolling direction of the raw material.

9. The method according to claim 7, wherein the raw material is steel.

10. The method according to claim 7, wherein the friction disk is a rotary disk.

11. The method according to claim 7, wherein the friction disk is a stationary disk.

12. The method according to claim 7, further comprising forming radially outwardly extending tab portions annularly spaced about an outer periphery of the substantially circular body.

13. The method according to claim 12, further comprising bending the radially outwardly extending tab portions in an axial direction.

14. The method according to claim 12, wherein the axial direction of the bent tab portions corresponds to the axially facing direction of the projection.

\* \* \* \* \*